Nov. 22, 1960     O. L. CUNNINGHAM     2,960,886
INSTANTLY RETARDABLE PRESET THROTTLE CONTROL MECHANISM
Filed Jan. 26, 1959
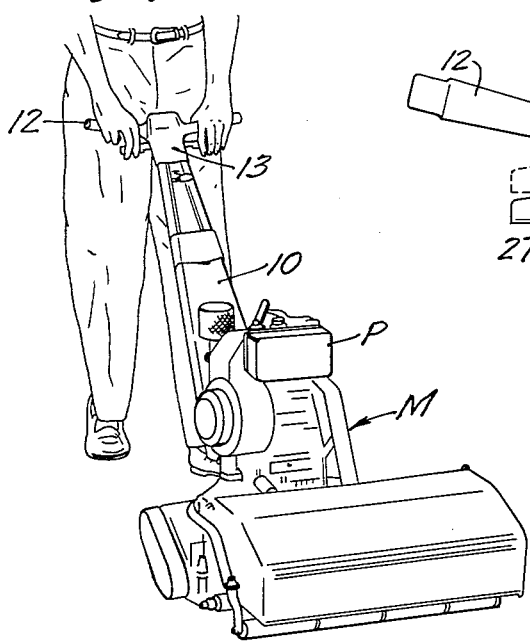
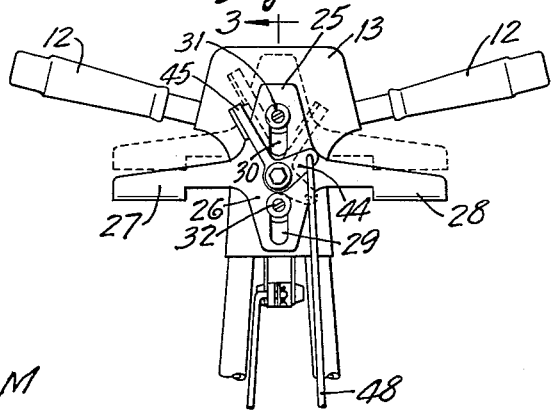
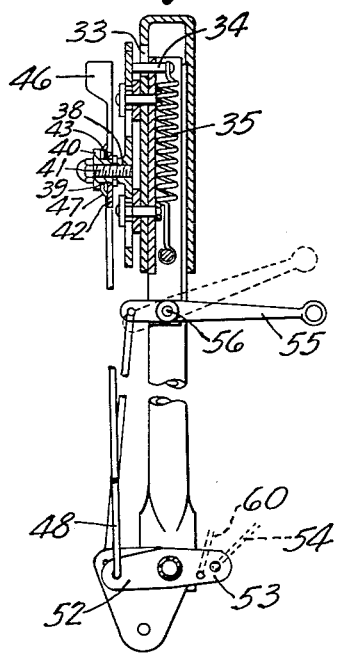
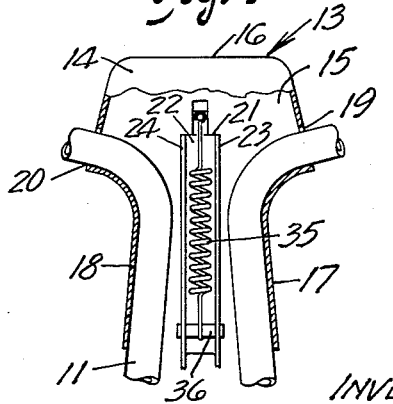
INVENTOR
OMAR LEO CUNNINGHAM
By His Attorneys
Williamson, Schroeder & Halmatier

United States Patent Office 2,960,886
Patented Nov. 22, 1960

2,960,886

INSTANTLY RETARDABLE PRESET THROTTLE CONTROL MECHANISM

Omar L. Cunningham, Minneapolis, Minn., assignor to Toro Manufacturing Corporation, Minneapolis, Minn., a corporation of Minnesota Filed Jan. 26, 1959, Ser. No. 788,933

8 Claims. (Cl. 74—488)

This invention relates to speed-regulating-mechanism for motor driven implements such as power lawn mowers, snow plows and the like, and more specifically to a presettable regulating mechanism for selectively setting and also instantly retarding a conventional control element of a power unit associated with a driven implement.

In power driven implements such as various types of lawn mowers, rotary snow plows, cutting and sawing implements and the like, it is desirable to provide simple and efficient control mechanism for selectively setting and controlling the normal operating speed of the power unit to compensate for a number of average varying loads on the power unit and to further provide for instant short-duration retarding of the speed to prevent "racing" of the motor and rotary parts during certain short period intervals. In the operation of revolved or rotary implements such as lawn mowers and snow plows, turning of the implement and reversing its course of travel, or travel over certain areas where the work load is negligible requires retarding quickly of the motor speed to prevent "racing" of motor and rotary parts. In the case of lawn mowers particularly those designed for cutting close to the ground as are employed in cutting the grass on golf course greens, the implement when turned to reverse its travel if "racing" occurs will usually cut unevenly and sometimes scalp the grass at the turn.

It is a general object of my invention to provide a simple, efficient presettable mechanism for selectively regulating and for also quickly retarding the conventional control element of a power driven implement.

A more specific object is the provision of a novel control and speed-regulating mechanism of the class described which provides in a simple unitary structure a presettable means for selectively regulating the motor speed in normal operation combined with an instantly actuatable speed retarding element to prevent racing of the motor and driven parts in certain operations, which when released after actuation thereof results in return of the mechanism to the predetermined speed regulation position.

A still further object is the provision of speed regulating and control mechanism of the class described combinatively associated with a handle or hand grip of guiding or steering mechanism for the implement to facilitate instantaneous hand actuation and release of the speed-retarding element.

These and other objects of the invention will be more apparent from the following description made in connection with the accompanying drawings, wherein like references refer to similar parts throughout the several views, and in which:

Fig. 1 is a perspective view of the invention mounted on a conventional power driven mower;

Fig. 2 is a rear view of the invention;

Fig. 3 is a cross sectional view taken on line 3—3 of Fig. 2; and

Fig. 4 is a front view of the mounting with parts broken away to show more clearly other detail.

In the embodiment shown in Fig. 1, M designates a conventional mower implement having a motor or power unit P attached to the implement handle 10. Handle 10 includes tubular members 11 terminating upwardly in handle bar grips 12. Secured to handle member 10 is a mounting 13 in the form of a housing. Mounting 13 includes a top plate 14, and a bottom plate 15, end wall 16 and side walls 17 and 18. Side walls 17 and 18 have openings 19 and 20 respectively to provide a passageway for handle bar grips 12.

Referring now to Figs. 3 and 4, secured to the bottom plate 15 of mounting 13 is a channel member 21. Channel member 21 includes a web portion 22 and flanges 23 and 24. The speed regulating mechanism comprises a shiftable member 25 having a body portion 26 and two laterally extending finger grip portions 27 and 28.

Referring to Fig. 2, it is noted that laterally extending finger grip portions 27 and 28 are substantially parallel with handle bar grips 12 and are disposed closely adjacent handle bar grips 12 whereby the operator can easily manipulate said finger grip portions while guiding a driven implement such as is shown in Fig. 1. Body portion 26 has two longitudinally spaced aligned slots 29 and 30. Shiftable member 25 is secured to mounting 13 by means of bolts 31 and 32. Bolts 31 and 32 may have disposed around the shank portions conventional frictional reducing roller elements 31a and 32a respectively. Bottom plate 15 of mounting 13 has a slot 33 formed in the upper end thereof. Body portion 26 has shiftable member 25 and has a lug 34 projecting inwardly through slot 33 into housing or mounting 13. Secured to flanges 23 and 24 of channel member 21 at the lower portion thereof is a pin 36 and secured to lug 34 and pin 36 is a spring 35. Slot 33 permits limited upward movement of lug 34.

Referring to Fig. 2, it is seen that shiftable member 25 is mounted on mounting 13 for limited sliding movement from a normal operating position shown in full lines to speed retarded position shown in dotted lines. Upon release of shiftable member 25, spring 35 urges said member to the operating position.

Referring now to Fig. 3, shiftable member 25 has an outwardly projecting boss 37 having a threaded bore 38 formed therein. Bushing 39 is secured to boss 37 by means of bolt 41. Bushing 39 has a flared portion 40 formed at its outer end. Bushing 39 projects through an opening 43 formed in a control element or lever 42. The control element in the embodiment shown is in the form of a bell crank having arms 44 and 45. Arm 45 has an offset finger tab portion 46. Bushing 39 projects through a locking element 47 which may be of the spring type washer. It is thus seen that control element 42 is mounted for oscillating or pivotal movement about bushing 39 and is frictionally locked in any one of several adjustable preset positions by means of locking element 47. Pivoting control element 42, in a clockwise manner when looking at Fig. 2, increases the speed of power unit P and movement in a counterclockwise manner reduces the speed of motor P.

Arm 44 of the control element 42 has pivotally secured thereto a link 48. Secured to the lower portions of tubular member 11 is a transverse pin 49 shown in dotted lines in Fig. 2. Journalled on transverse pin 49 is a sleeve 50. Fixedly secured to sleeve 50 is a lever 51. Lever 51 includes an arm 52 and an arm 53. Pivotally secured to arm 52 is the lower end of link 48 and pivotally secured to arm 53 is a link 54. shown in dotted lines in Fig. 3, which is connected to the conventional throttle control lever of motor P. Conventional clutch control lever 55 is pivotally secured to flanges 23 and 24 of channel member 21 as at 56 and secured to one arm of clutch control lever 55 is link 57. The link 57 is pivotally secured to lever 59 and lever 59 has pivotally secured thereto link 60 connected to a conventional clutch mechanism. This clutch control lever and clutch actuating linkage, however, form no part of the present invention.

The operation of the presettable speed regulating mechanism is thought to be simple and apparent. For example, when adapted for use with a hand-guided power mower, as shown in Fig. 1, the control element 42 is first pivoted in a clockwise direction to a selected preset setting for driving the cutting tool of the mower at a desired operative speed. In the event the mower is traversing an area of uneven growth which requires the reducing of the operative speed of the cutting tool, the operator grasps finger grip portions 27 and 28 and pulls shiftable member 25 in an upward or speed retarding direction. Control element 42 is held in the selected preset position by locking element 47 and moves in fixed relation with shiftable member 25 as the latter slides upwardly. The upward sliding of shiftable member 25 and control element 42 moves link 48 causing sleeve 50 to rotate on pin 49 which in turn imparts a pivoting action to lever 51. The pivoting of lever 51 in the above manner actuates the conventional throttle control lever through the action of link 54 whereby the speed of power unit 10, which drives the cutting tool of the mower, is quickly retarded and upon release of the finger grip portions 27 and 28, the speed regulating mechanism is automatically urged back to the original preset operation position by spring member 25. The upward movement of shiftable member 25 is limited, of course, by the engagement of roller elements 31a and 32a with the lower portions of slots 29 and 30 respectively.

It will, of course, be understood that various changes may be made in the form, details, arrangement and proportions of the parts without departing from the scope of the invention which consists of the matter shown and described herein and set forth in the appended claims.

What is claimed is:

1. Speed regulating mechanism for a motor driven implement comprising a mounting, a shiftable control member attached to said mounting for limited movement between a first normally operating position and a second, speed-retarded position and for return to said first position, a control element mounted on said shiftable member and adjustable thereon to selective preset positions to regulate speed of said implement when said shiftable member is in said first position and actuating connections extending from said control element, the shifting of said control member from said first position moving said control element and said actuating connections in speed-retarding direction, and resilient means urging said shiftable control member to said first position.

2. Control mechanism for regulating and quickly shifting the conventional control element of a motor associated with a driven implement having in combination a mounting, a shiftable member attached to said mounting for limited movement in a speed-retarding direction between a first normally operating position and a second speed-retarded position and for return to said first position, a control lever pivotally mounted on said shiftable member and pivotally adjustable thereon to selective preset position to regulate speed of said motor, and actuating connections extending from said control lever to the conventional control element of said motor, the shifting of said member from said first position moving said control lever and said actuating connections in speed-retarding direction.

3. Speed regulating mechanism for a motor driven implement comprising a mounting, a shiftable control member attached to said mounting for limited sliding movement relative to said mounting between a first, normally operating position to a second, speed-retarded position and for return to said first position, a control element mounted on said shiftable member and selectively adjustable thereon to various preset positions to selectively regulate speed of said implement when said shiftable member is in said first position, and actuating connections extending from said control element, the shifting of said control member from said first position moving said control element in fixed relation therewith and simultaneously moving said actuating connections in speed-retarded direction.

4. The structure as set forth in claim 3 and means urging said control member to said first position.

5. Speed regulating mechanism for a motor driven implement comprising a mounting, a shiftable control member attached to said mounting for limited sliding movement relative to said mounting between a first position and second, speed-retarded position and for return to said first position, a control lever pivotally mounted on said shiftable member and selectively adjustable thereon to various preset positions to regulate speed of said implement when said shiftable member is in said first position and actuating connections extending from said control lever, the shifting of said control member from said first position moving said control lever and said actuating connections in speed-retarding direction.

6. The structure set forth in claim 5 and means urging said shiftable control member to said first position.

7. Control mechanism for regulating and quickly shifting the conventional control element of a motor associated with a driven implement having in combination an elongate handle secured to said implement, said handle terminating upwardly in handle bars for guiding said implement, a mounting secured to said handle, a shiftable member attached to said mounting for limited movement in speed retarding direction between a first position and second position and for return to said first position, said shiftable member having a finger grip portion for shifting said shiftable member, said finger grip portion disposed closely adjacent said handle bars whereby the shiftable member may be shifted while guiding said implement, a control lever pivotally mounted on said shiftable member and pivotally adjustable thereon to selective preset positions to regulate speed of said motor and actuating connections extending from said control lever to the conventional control element of said motor, the shifting of said member from said first position moving said control lever and said actuating connections in speed-retarding direction.

8. Control mechanism for regulating and quickly shifting the conventional control element of a motor associated with a driven implement having in combination an elongate handle secured to said implement, a mounting affixed to said handle, a shiftable member attached in slidable relation to said mounting and being slidable thereon longitudinally of said handle between a first, normally operating position to a second, speed-retarded position and for return to said first position, a control lever for regulating the speed of said motor and having actuating connections extending therefrom to the conventional control element of said motor, means mounting said lever on said control member for pivotal adjustment to selective preset positions about an axis disposed substantially normal to said member, and the sliding of said control member from said first position moving said control lever in fixed relation therewith and simultaneously moving said actuating connections in speed-retarding direction.

References Cited in the file of this patent
UNITED STATES PATENTS

| | | |
|---|---|---|
| 85,628 | Yost | Jan. 5, 1869 |
| 2,591,746 | Tom | Apr. 8, 1952 |
| 2,627,836 | Buske | Feb. 10, 1953 |
| 2,696,741 | Wilkin | Dec. 14, 1954 |
| 2,702,502 | Rogneby | Feb. 22, 1955 |
| 2,736,350 | Hill et al. | Feb. 28, 1956 |
| 2,740,246 | Smith et al. | Apr. 3, 1956 |
| 2,850,003 | Konle | Sept. 2, 1958 |

FOREIGN PATENTS

| | | |
|---|---|---|
| 647,443 | Great Britain | Dec. 13, 1950 |